United States Patent
Takeuchi et al.

(10) Patent No.: US 9,197,047 B2
(45) Date of Patent: Nov. 24, 2015

(54) WIRE GUIDING OUT PORTION STRUCTURE FOR WINDING TAPE

(75) Inventors: Kunihiko Takeuchi, Makinohara (JP); Takeshi Onoda, Makinohara (JP)

(73) Assignee: Yazaki Corporation, Tokyo (JP)

( * ) Notice: Subject to any disclaimer, the term of this patent is extended or adjusted under 35 U.S.C. 154(b) by 183 days.

(21) Appl. No.: 14/009,151

(22) PCT Filed: Apr. 3, 2012

(86) PCT No.: PCT/JP2012/002307
§ 371 (c)(1),
(2), (4) Date: Oct. 1, 2013

(87) PCT Pub. No.: WO2012/137477
PCT Pub. Date: Oct. 11, 2012

(65) Prior Publication Data
US 2014/0027146 A1    Jan. 30, 2014

(30) Foreign Application Priority Data
Apr. 4, 2011   (JP) .................................. 2011-082654

(51) Int. Cl.
*H02G 3/08* (2006.01)
*B60R 16/023* (2006.01)

(52) U.S. Cl.
CPC .............. *H02G 3/08* (2013.01); *B60R 16/0238* (2013.01); *B60R 16/0239* (2013.01)

(58) Field of Classification Search
USPC ................ 174/64, 72 A, 71 R, 68.3; 138/110
See application file for complete search history.

(56) References Cited

U.S. PATENT DOCUMENTS

| 8,188,368 B2 * | 5/2012 | Suzuki ........................ 174/72 A |
| 2010/0236826 A1 | 9/2010 | Suzuki |

FOREIGN PATENT DOCUMENTS

| EP | 0865131 A1 | 9/1998 |
| EP | 2402218 A1 | 1/2012 |
| JP | 07-065660 A | 3/1995 |
| JP | 2007-028806 A | 2/2007 |

OTHER PUBLICATIONS

International Search Report and Written Opinion dated Jul. 11, 2012, issued for PCT/JP2012/002307.
Notification of Reason for Refusal mailed Jul. 21, 2015, issued for the Japanese patent application No. 2011-082654 and English translation thereof.

* cited by examiner

*Primary Examiner* — Dhirubhai R Patel
(74) *Attorney, Agent, or Firm* — Locke Lord LLP

(57) ABSTRACT

A wire guiding out portion structure for winding a tape includes: a gutter-shaped or inverted-gutter-shaped wire guiding wall; and a plate-shaped wire supporting wall opposed to the wire guiding wall. At least two ribs for preventing a tape from slipping arranged parallel to each other in a wire guiding out direction are provided on at least one of the wire guiding wall and the wire supporting wall. A leading rib of the wire guiding wall or the wire supporting wall is projected longer in a wire radial direction than a second rib of the wire guiding wall or the wire supporting wall. At least two ribs arranged parallel to each other in a wire guiding out direction are provided on the wire guiding wall and the wire supporting wall. The ribs of the wire guiding wall are projected in the same height in the wire radial direction.

3 Claims, 3 Drawing Sheets

WIRE GUIDING OUT PORTION STRUCTURE FOR WINDING TAPE

TECHNICAL FIELD

This invention relates to a wire guiding out portion structure for winding a tape configured to fix a wiring harness guided out from an electric junction box or the like of, for example, a vehicle with a wound tape.

BACKGROUND ART

Conventionally, various wire guiding out portion structures for winding a tape are suggested for fixing a wiring harness (a plurality of electric wires) to a wire guiding out portion of an electric junction box with a wound tape.

For example, in PLT1 (not shown), it is described that an electric junction box is composed of a lower case and an upper cover. The upper cover is attached to the lower case. A connection block to which electric components such as fuse or relay are attached is inserted into the lower case. In this electric junction box, as a wire guiding portion, the connection block has an inverted gutter shaped upper fixing piece. The lower case has a gutter shaped lower fixing piece. Electric wires as a wiring harness connected to electric components in the connection block are inserted between the upper and lower fixing pieces, and fixed to the upper and lower fixing pieces with a wound tape.

As the wire guiding out structure for winding a tape other than the above described, there is a wire guiding out structure for winding a tape shown in FIG. 6. According to this structure, an electric junction box includes: a frame 41 receiving a not-shown connection block; a lower cover attached to the frame 41; and a not-shown upper cover. A plurality of electric wires as a wiring harness 43 continued to electric components in the connection block are guided out along an inverted gutter shaped wire guiding wall 44 of the frame 41 and along a plate shaped wire supporting wall 45 of the lower cover 42. A wire guiding out portion 46 composed of the wire guiding wall 44 and the wire supporting wall 45 is wound several times together with the wiring harness 43 with a tape 47.

The wire supporting wall 45 is flexible up and down (in a thickness direction) when winding a tape corresponding to a variation of a receiving amount of the wires 43a in the wire guiding out portion 46. An outer peripheral wall of the wire guiding wall 6 and a lower face (outer face) of the wire supporting wall are respectively provided with plurality of (two each in this example) ribs 48, 49 for preventing the tape from slipping arranged parallel to each other in a wire insertion direction.

CITATION LIST

Patent Literature

[PLT1]
JP, A, 2007-28806 (FIGS. 1, 2, and 6)

SUMMARY OF INVENTION

Technical Problem

However, in the conventional wire guiding out portion structure for winding a tape shown in FIG. 6, for example, when the wire guiding out portion 46 is formed in a taper shape as shown in FIG. 6, the wound tape is in a taper shape and there is a problem that a tape is easily displaced (falls out).

Further, even in a case that the wire guiding out portion 46 is not in a taper shape, for example, when the receiving amount of the wires in the wire guiding out portion 46 is small, the wire supporting wall 45 is bent inward (upward) and inclined, and a rib 49 for preventing a tape from slipping of the wire supporting wall 45 is inclined upward integrally with the wire supporting wall 45. Thereby, there is a problem that a tape is easily displaced (falls out) because the tape 47 wound around the wire guiding out portion 46 and the wiring harness 43 is in a taper shape.

When the tape is displaced, the fixing force of the wiring harness 43 to the wire guiding out portion 46 is reduced, and there is a problem that a friction may be generated between the wiring harness 43 and the wire guiding out portion 46, and water may enter an inside of the electric junction box via a gap generated by the displacement of the tape. This problem may occur not only in the wire guiding out portion 46 of the electric junction box, but also in the wire guiding out portion 46 of a not-shown harness protector or the like.

In view of the above problem, an object of the present invention is to provide a wire guiding out portion structure for winding a tape allowing a tape to be hardly displaced even when a wire guiding out portion is formed in a taper shape, or when a wire supporting wall of the wire guiding out portion is flexible inwardly in a sloped shape for absorbing a receiving amount of wires.

Solution to Problem

For attaining the object, according to the invention claimed in claim 1, there is provided a wire guiding out portion structure for winding a tape comprising:
a gutter-shaped or inverted-gutter-shaped wire guiding wall; and
a plate-shaped wire supporting wall opposed to the wire guiding wall,
wherein at least two ribs for preventing a tape from slipping arranged parallel to each other in a wire guiding out direction are provided on at least one of the wire guiding wail and the wire supporting wall, and
wherein a leading rib of the wire guiding wall or the wire supporting wall is projected longer in a wire radial direction than a second rib of the wire guiding wall or the wire supporting wall.

According to the above structure, a leading rib, namely a tip-side rib of the wire guiding wall or the wire supporting wall is projected longer in a wire radial direction than a second rib. Therefore, even in a case that the wire supporting wall is inclined inwardly in a taper shape as extending toward the tip with respect to the wire guiding wall, when a plurality of wires (wiring harness) is wound with a tape at the wire guiding out portion composed of the wire guiding wall and the wire supporting wall, the leading rib prevents the tape from being displaced in a front-back direction (a wire longitudinal direction).

For example, the ribs may be provided on only the wire guiding wall or only the wire supporting wall. The ribs may be provided on both the wire guiding wall and the wire supporting wall. (In this case, the leading rib on any one of the wire guiding wall and the wire supporting wall or the leading ribs on both of them may be projected longer. Alternatively, only one rib is provided on any one of them.) When two ribs are provided on both of them, preferably, virtual lines connecting the tips of ribs of both of them are parallel to each other, or substantially parallel to each other, or in an inverted taper shape wider as they extend toward the tip of the wire guiding out portion. However, even when the virtual lines are in a taper shape narrower as toward the tip of the wire guiding out portion, the leading rib projected longer prevents the tape from being displaced. Preferably, the wire supporting wall is flexible in a thickness direction.

According to the invention claimed in claim 2, there is provided a wire guiding out portion structure for winding a tape comprising:

a gutter-shaped or inverted-gutter-shaped wire guiding wall; and a plate-shaped wire supporting wall opposed: to the wire guiding wall, wherein at least two ribs for preventing a tape from slipping arranged parallel to each other in a wire guiding out direction are provided on the wire guiding wall and the wire supporting wall, wherein the ribs of the wire guiding wall are projected in the same height in the wire radial direction, wherein a leading rib of the wire supporting wall is projected longer in a wire radial direction than a second rib of the wire supporting wall, and wherein while a plurality of wires are fixed between the wire guiding wall and the wire supporting wall with the wound tape, a wound tape portion along the ribs of the wire guiding wall and a wound tape portion along the ribs of the wire supporting wall are positioned parallel to each other or substantially parallel to each other.

According to the above structure, the leading rib, namely, the tip-side rib of the wire supporting wall is projected longer than the second rib. Therefore, even when the wire supporting wall is inclined inward in a taper shape toward the tip with respect to the wire guiding wall, the virtual line connecting a projecting tip of the leading rib of the wire supporting wall and a projecting tip of the second rib and the virtual line connecting projecting tips of the ribs of the wire guiding wall are parallel to each other, or substantially parallel to each other. Therefore, when the plurality of wires (wiring harness) is wound around the wire guiding out portion composed of the wire guiding wall and the wire supporting wall with the tape, the tape portions are positioned parallel to each other or substantially parallel to each other along the projecting tip (for example, upper end) of the ribs of the wire guiding wall and along the projecting tip (for example, lower end) of the ribs of the wire supporting wall. Thereby, the tape is prevented from being displaced in the front and back direction (the wire longitudinal direction).

According to the invention claimed in claim 3, there is provided the wire guiding out portion structure for winding a tape as claimed in claim 2, wherein the wire supporting wall is flexible in a thickness direction, and wherein while the wire supporting wall is bent inward with the wound tape, the wound tape portion along the ribs of the wire guiding wall and the wound tape portion along the ribs of the wire supporting wall are positioned parallel to each other or substantially parallel to each other.

According to the above structure, upon winding the tape, the wire supporting wall is bent inward in the wire radial direction to absorb a receiving amount of the wires in the wire guiding wall, and an outer peripheral wall of the wires is closely abutted on an inner face of the wire guiding wall and on an inner face of the wire supporting wall. In this condition, the virtual line connecting the projecting tip of the leading rib of the wire supporting wall with the projecting tip of the second rib and the virtual line connecting the projecting tips of the ribs of the wire guiding wall are positioned parallel to each other, or substantially parallel to each other. The tape portions are positioned parallel to each other, or substantially parallel to each other along the projecting tips (for example, upper end) of the ribs of the wire guiding wall and along the projecting tips (for example, lower end) of the ribs of the wire supporting wall. Thereby, the tape is prevented from being displaced in the front and back direction (the wire longitudinal direction).

Advantageous Effects of Invention

According to the invention claimed in claim 1, for example, even when the wire guiding out portion composed of the wire guiding wall and the wire supporting wall 21 is formed in a taper shape, or inclined in a taper shape by the wound tape, the leading rib projected longer prevents the tape from being displaced. Thereby, reduction of the fixing property of the wiring harness or immersion of water or the like caused by the displacement of the tape is prevented.

According to the invention claimed in claim 2, for example, even in a case that the wire guiding out portion composed of the wire guiding wall and the wire supporting wall 21 is formed in a taper shape, when the tape portions are wound not in a taper shape but parallel to each other or substantially parallel to each other in the wire radial direction along the leading rib of the wire supporting wall projected longer, the tape is prevented from being displaced. Thereby, reduction of the fixing property of the wiring harness or immersion of water or the like caused by the displacement of the tape is prevented.

According to the invention claimed in claim 3, even in a case that the wire supporting wall is flexible inwardly in a sloped shape for absorbing the receiving amount of the wires, when the tape portions are wound not in a taper shape but parallel to each other or substantially parallel to each other in the wire radial direction along the leading rib of the wire supporting wall projected longer, the tape is prevented from being displaced. Thereby, reduction of the fixing property of the wiring harness or immersion of water or the like caused by the displacement of the tape is prevented.

DESCRIPTION OF EMBODIMENTS

FIGS. 1 to 5 show an embodiment of a wire guiding out portion structure for winding a tape according to the present invention.

Figure 1:
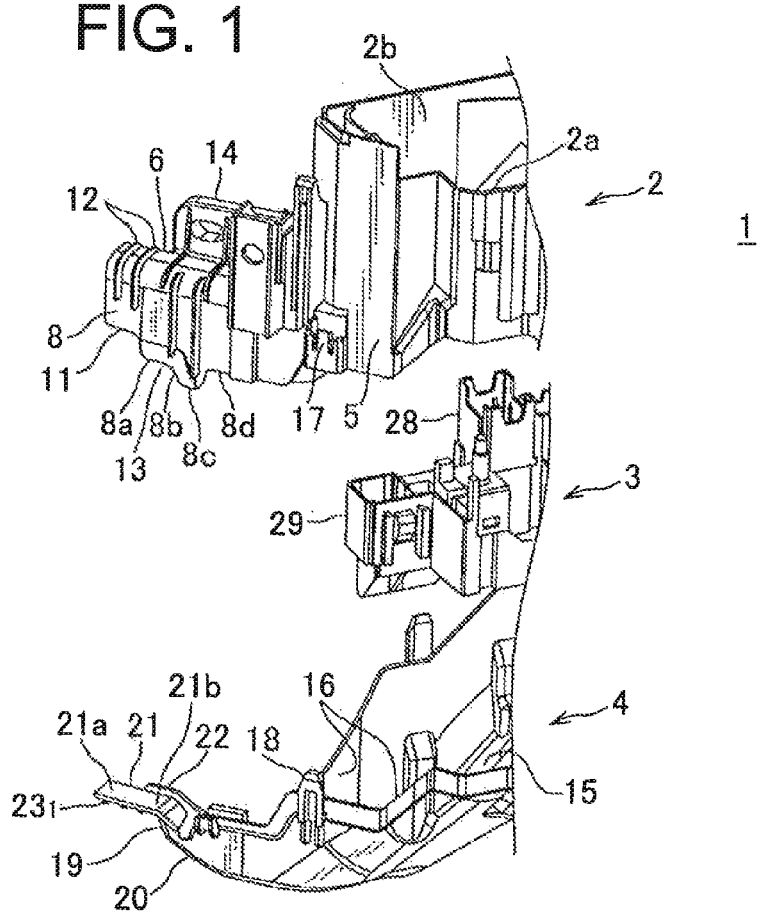
FIG. 1 is an exploded perspective view showing an embodiment of an electric junction box having an embodiment of a wire guiding out portion structure for winding a tape according to the present invention.

As shown in FIG. 1, this wire guiding out portion structure for winding a tape is, for example, used in an electric junction box 1 such as a fuse block. The electric junction box 1 includes: a synthetic-resin-made frame 2; insulating-resin-made connection block 3 inserted into the frame 2 from a lower side of the frame 2; a synthetic-resin-made lower cover 4 attached to a lower side of the frame 2 to close a lower opening; and a not-shown synthetic-resin-made upper cover attached to an upper side of the frame 2 to close an upper opening.

The frame 2 includes: a vertical peripheral wall 5 having an internal space (block receiving space) 2b passing through up and down; and an inverted gutter shaped (inverted U-shaped vertical section) wire guiding wall 6 projected forward substantially horizontally and integrally from the peripheral wall 5.

Figure 2:
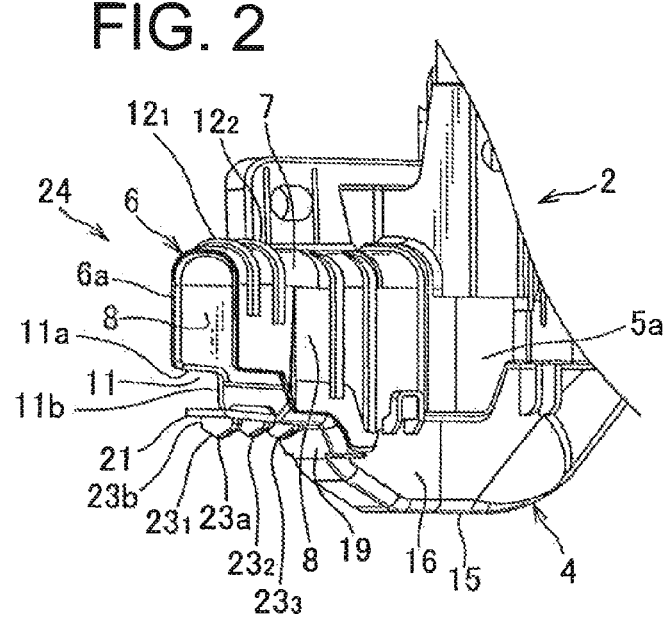
FIG. 2 is a perspective view of an assembled wire guiding out portion structure for winding a tape of FIG. 1.

As shown in FIG. 2, the wire guiding wall 6 is composed of an upper curved wall 7 and left and right vertical sidewalls 8, and includes a plurality of ribs 12 ($12_1$, $12_2$) (two in this embodiment) for preventing the tape from slipping arranged parallel to each other in a wire insertion direction (longitudinal direction) from the curved wall 7 to an upper half of the both sides sidewalls 8. A notch portion 11 as a space for allowing a later-described wire supporting wall 21 of the lower cover 4 to bend upward is provided on a lower side of the front end of the both sides sidewalls 8 of the wire guiding wall 6.

An upper side portion 11a of the notch portion 11 is continued perpendicular to a tip (front end) 9 of the wire guiding wall 6. A rear side portion 11b is continued to a horizontal short lower side portion 8a (FIG. 1) of the sidewall 8. The lower side portion 8a is continued to a lower sloped side portion 8b. The sloped side portion 8b is continued to a rear downward-facing convex wall 8c. The convex wall 8c is continued to a rear long lower side portion 8d. The short lower side portion 8a wad the sloped side portion 8b compose a step portion 13 for engaging with the lower cover 4.

A bracket 14 for fixing the frame 2 to a vehicle body is provided on a base end of the wire guiding wall 6. A space (wire insertion space) in the wire guiding wall 6 is communicated with a space 2b in the peripheral wall 5 via a not-shown substantially inverted U shaped opening of the peripheral wall 5. Incidentally, in this specification, directional property such as front, rear, left, and right is denoted as a matter of convenience for explanation, and does not necessarily correspond to an attaching direction of the electric junction box 1.

As shown in FIG. 1, the lower cover 4 includes: a bottom wall 15; and left and right sidewalls 16 vertically extended from the bottom wall 15. A locking frame piece (receiving portion) 18 with respect to a locking piece (locking portion) 17 of the frame 2 as a locking member is provided on the sidewall 16. The bottom wall 15 is extended obliquely at a front side of the bottom wall to form a sloped bottom wall 19 (FIG. 2). An upper side of the sidewall 16 at one side of the sloped bottom wall 19 is notched in a concave shape (the concaved portion is denoted by reference sign 20). A rectangular plate shaped wire supporting wall 21 is projected forward (outward) substantially horizontally from an upper end of the sloped bottom wall 19.

A rear half portion 21b of the wire supporting wall 21 has low-profile sloped rib-shaped sidewalls 22 at left and right sides. A front half portion 21a of the wire supporting wall 21 is formed in a plate shape without sidewall. At least the front half portion 21a of the wire supporting wall 21 is flexible in a thickness direction (vertical direction).

As shown in FIG. 2, a plurality of (three in this embodiment) ribs 23 ($23_1$, $23_2$, $23_3$) for preventing the tape from slipping is projected parallel to each other in the wire insertion direction (longitudinal direction) from a lower face of the wire supporting wall 21. Each rib 23 is integrally formed with the wire supporting wall 21 by resin molding similar to each rib 12 of the wire guiding wall 6.

As later-described in FIG. 4, two ribs $23_1$, $23_2$ are arranged at a front half 21a of the wire supporting wall 21 of FIG. 2, and one rib $23_3$ is arranged at a rear half 21b of the wire supporting wall 21. The leading rib $23_1$ at the front half 21a is projected downward longer than the other ribs $23_2$, $23_3$. Each rib 23 includes an arc-shaped lower end face 23a. The leading rib $23_1$ includes short vertical side faces 23b at both left and right sides continued to the arc-shaped lower end face 23a.

As shown in FIG. 2, an upper end of the sidewall 16 of the lower cover 4 is joined to a lower end of a sidewall 5a of the frame 2. The sloped bottom wall 19 is joined to the sloped side portion 8b of a rear half (FIG. 1) of the wire guiding wall 6. The convex wall 8c (FIG. 1) is joined to the concave portion 20 (FIG. 1) at a rear side of the sloped bottom wall 19. A short horizontal bottom side portion 8a (FIG. 1) is joined to the low-profile sloped rib-shaped sidewall 22 (FIG. 1) of a rear half portion 6b of the wire guiding wall 6. The front half portion 21b of the wire supporting wall 21 is positioned at a lower side of the notch portion 11. A wire guiding out portion 24 is composed of the wire guiding wall 6 and the wire supporting wall 21. When the rear half portion 6b of the wire guiding wall 6 and the sloped bottom wall 19 are abutted on and engaged with the step portion 13 (FIG. 1) at a lower side of the wire guiding wall 6, the wire guiding wall 6 is prevented from being shaken and displaced.

Figure 3:
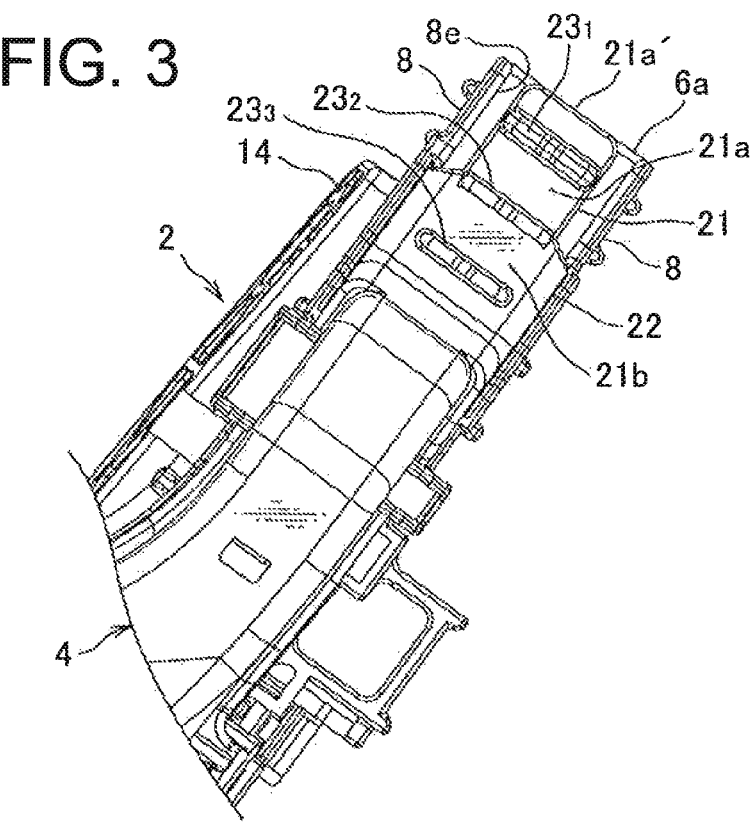
FIG. 3 is a bottom view of the wire guiding out portion structure for winding a tape of FIG. 1.

As shown in FIG. 3 (bottom view), the front half portion 21a of the wire supporting wall 21 is formed narrower than an outer width and an inner width (inner wall is denoted by reference sign 8e) of the left and right sidewalls 8 of the wire guiding wall 6, and is flexible in a thickness direction (vertical direction). A tip (front end) 21 of the wire supporting wall 21 is arranged in the same vertical plane as a tip (front end) 6a (FIG. 2) of the wire guiding wall 6. Reference sign 22 denotes a sloped-rib-shaped sidewall at the rear half 21b.

The leading rib $23_1$ for preventing the tape from slipping at the front half 21a of the wire supporting wall 21 is formed thicker in the longitudinal direction than the other ribs $23_2$, $23_3$. A width of the leading rib $23_1$ in a horizontal direction is the same as the other ribs $23_2$, $23_3$, and the same as the front half 21a of the wire supporting wall 21. The leading rib $23_1$ is arranged a little backward than the front end 21a' of the wire supporting wall 21. The middle (second) rib $23_2$ is arranged on a border between the front half 21a and the rear half 21b of the wire supporting wall 21. The third rib $23_3$ is arranged near the rear end of the rear half 21b of the wire supporting wall 21. Each rib 23 is arranged at a constant pitch in the longitudinal direction.

As shown in FIG. 1, the connection block 3 includes: a fusible link attaching portion 28; a connector attaching portion 29; a not-shown relay attaching portion; a fuse attaching portion; and the like. Electric wires connected to these not-shown electric components such as fusible link, relay, and fuse and an electric wire guided out of a connector as a wiring harness 25 (FIG. 4) are guided out downward, and guided out from the wire guiding portion 24 while protected by the lower cover 4.

Figure 4:
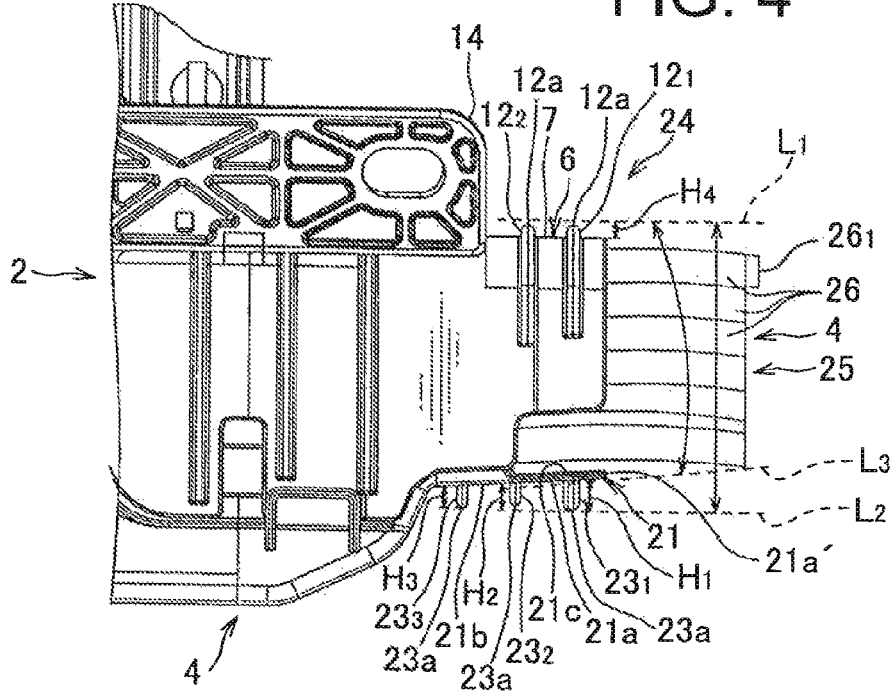
FIG. 4 is a side view showing the wire guiding out portion structure for winding a tape into which a wiring harness is inserted.

As shown in FIG. 4, a downward projecting length H1 of the leading rib $23_1$ of the front half 21a of the wire supporting wall 21 is longer than downward projecting lengths H2. H3 of the other two ribs $23_2$, $23_3$. According to the embodiment shown in FIG. 4, in a free condition in which the tape is not wound, the wire supporting wall 21 is inclined gradually upward as toward the tip (front end) 21a'. The lower end 23a of the leading rib $23_1$ is lower than the lower end 23a of the second rib $23_2$ (the lower end $23a$ of the leading rib $23_1$ is projected downward longer than the lower end $23a$ of the second rib $23_2$).

Figure 5:
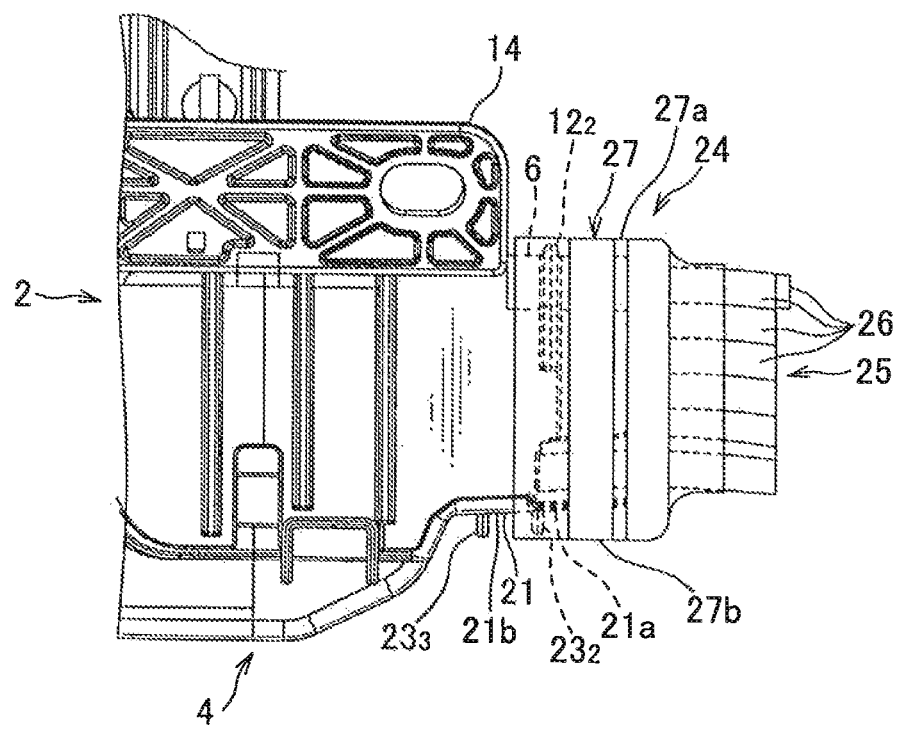
FIG. 5 is a side view showing a state that the wiring harness is fixed by the wound tape.

Because the third rib $23_3$ is arranged at the lower base end side of the rear half $21b$ of the wire supporting wall 21, a height of the lower end $23a$ of the leading rib $23_1$ is substantially the same as the lower end $23a$ of the third rib $23_3$. Preferably, the lower end $23a$ of the leading rib $23_1$ is lower than the lower end $23a$ of the third rib $23_3$ (the lower end $23a$ of the leading rib $23_1$ is projected downward longer than the lower end $23a$ of the third rib $23_3$). As shown in FIG. 5, the third rib 233 is auxiliary, and may not be wound with a tape.

Upward projecting heights (length) H4 of the ribs $12_1$, $12_2$ of the wire guiding wall 6 of the frame 2 are the same A top of an upper wall 7 of the wire guiding wall 6 is horizontal, and upper ends $12a$ of the two ribs $12_1$, $12_2$ are positioned on a virtual horizontal line $L_1$. The lower leading rib $23_1$ is positioned at a lower side (on substantially the same vertical line) of the upper front rib $12_1$. The lower second rib $23_2$ is positioned at a lower, a little back side of the upper rear rib $12_2$.

A not-shown virtual line connecting the lower end $23a$ of the leading rib $23_1$ and the lower end $23a$ of the second rib $23_2$ is inclined a little up in front. A virtual line $L_2$ connecting the lower end $23a$ of the leading rib $23_1$ and the lower end $23a$ of the third rib $23_3$ is positioned substantially horizontal. In the free condition, an upper face (inner face) $21c$ and a lower face (outer face) of the wire supporting wall 21 are inclined a little up in front. Therefore, an extended line $L_3$ of the lower face of the wire supporting wall 21 is inclined a little up in front. A virtual line $L_1$ connecting the upper ends $12a$ of the upper two ribs $12_1$, $12_2$ of the wire guiding wall 6 and a virtual line $L_2$ connecting the lower ends $23a$ of the lower leading rib $23_1$ and the third rib $23_3$ are positioned parallel to each other or substantially parallel to each other.

In FIG. 4, the wiring harness 25 is shown short as a matter of convenience, and in practice, is extended long and connected to electric components (load side) or the like in a not-shown vehicle. The wires 26 composing the wiring harness 25 are arranged in a plurality of lines from side to side, up and down (a rear side wire in the horizontal direction is denoted by reference sign $26_1$).

As shown in FIG. 5, a synthetic-resin-made one-side adhesive tape 27 is wound a plurality of times in a row around an outer peripheral wall of the wire guiding out portion 24 composed of the wire guiding wall 6 and the wire supporting wall 21, and an outer peripheral wall of the wiring harness 25 so that the wiring harness 25 is fixed to the wire guiding out portion 24, and the gap between the wire guiding out portion 24 and the wiring harness 25 is eliminated to make it watertight.

When the tape 27 is wound tightly, the front half $21a$ of the wire supporting wall 21 is bent upward and closely abutted on the lower end face of the wiring harness 25. At this time, the lower end $23a$ of the leading rib $23_1$ for preventing the tape from slipping is substantially the same height as the lower end $23a$ of the second rib $23_2$ and is on a virtual horizontal line. Further, an upper end and a lower end $27b$ of the wound tape 27 are parallel (horizontal) to each other, or substantially parallel to each other. Namely, a wound portion $27a$ along ribs 12 of the wire guiding wall 6 and a wound portion $27b$ along the ribs 23 of the wire supporting wall 21 are parallel to each other, or substantially parallel to each other, and not in a taper shape as the conventional way. Thereby, the tape 27 is prevented from being displaced or falling out in the longitudinal direction.

Figure 6:
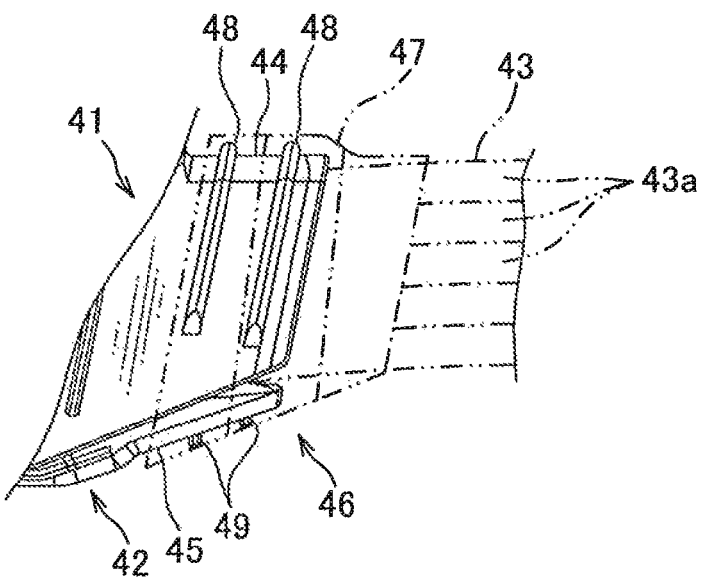
FIG. 6 is a side view showing an embodiment of a conventional wire guiding out portion structure for winding a tape.

For example, as the conventional way (FIG. 6), even when the lower end face of the wire supporting wall 21 is formed in a taper shape with respect to the upper end face of the wire guiding wall 6, as shown in FIG. 4, the projecting length $H_1$ of the leading rib $23_1$ of the wire supporting wall 21 is designed to be projected longer than the projecting length $H_2$ of the second rib 232. In the free condition of the wire supporting wall 21 (tape is not wound), or in a condition that the tape is wound shown in FIG. 5, the virtual line $L2$ connecting the lower ends $23a$ of the leading rib 231 and the second rib 232 and the virtual line $L1$ connecting the upper ends $12a$ of the ribs 12 are designed to be parallel to each other, or substantially parallel to each other. Thereby, the upper end $27a$ and the lower end $27b$ of the wound tape 27 are positioned parallel to each other, or substantially parallel to each other. Namely, a wound portion $27a$ along ribs 12 of the wire guiding wall 6 and a wound portion $27b$ along the ribs 23 of the wire supporting wall 21 are parallel to each other, or substantially parallel to each other. Therefore, similarly, the tape 27 is prevented from being displaced or falling out in the longitudinal direction.

In FIG. 4, the virtual line $L1$ connecting the upper ends $12a$ of the upper ribs 12 and the virtual line $L2$ connecting the lower ends $23a$ of the leading rib $23_1$ and the second rib $23_2$ after wound by the tape are unnecessarily horizontal, and may be inclined parallel to each other (should be only parallel to each other). The tape 27 is adhered to the projecting tips $12a$, $23a$ of the ribs 12, 23 and the faces between the ribs 12, 23 (an outer face of the wire guiding wall 6 and a lower face of the wire supporting wall 21). A winding direction of the tape 27 may start from the wire guiding wall 6 side and stop to the wiring harness 25 side or vice versa.

In FIG. 5, the third (rear end side) rib $23_3$ may be wound with the tape obliquely backward from the upper rear side rib $12_2$. Because there is a bracket 14, the third rib is not provided on the upper side (wire guiding wall 6). If the third rib is provided on the upper side at the same height as the other upper ribs 12 instead of the bracket 14, preferably, the third rib $23_3$ of the wire supporting wall 21 is projected the same height as the second rib $23_2$ or projected shorter than the second rib $23_2$ so that the upper end $27a$ and the lower end $27b$ of the wound tape 27 are parallel to each other, or substantially parallel to each other.

Incidentally, in the above embodiment, the inverted gutter shaped wire guiding wall 6 is provided at the upper side, and the plate shaped wire supporting wall 21 is provided at the lower side for improving waterproof performance with respect to cleaning water from above when, for example, the electric junction box 1 is disposed on an engine room of a vehicle. However, when the electric junction box is disposed at a place where no cleaning water is applied, it is possible that a gutter shaped (U-shaped) wire guiding wall 6 is provided on the lower cover 4, an upper wire supporting wall 21 is provided on the frame 2.

Further, in the above embodiment, the frame 2 and the lower cover 4 are separately provided, and the wire guiding wall 6 and the wire supporting wall 21 are separately formed. However, for example, in a case that the wire guiding wall 6 and the wire supporting wall 21 are integrally provided up and down in a junction box main body or a case in which the frame 2 and the lower cover 4 are integrally provided, it is also effective that the plurality of ribs 23 for preventing the tape from slipping having different projecting lengths is provided on the wire supporting wall 21, and the plurality of ribs 23 for preventing the tape from slipping having the same projecting lengths is provided on the wire guiding wall 6. The shape of the wire guiding wall 6 may be a gutter shape of which upper wall 7 is not curved but planar.

Further, in the above embodiment, an example in which the wire guiding wall 6 and the wire supporting wall 21 are provided on the electric junction box main body (the frame 2 and the lower cover 4) is explained. However, the wire guiding out portion structure for winding a tape of the present invention is not only used in the electric junction box 1, for example, but also used in a not-shown synthetic-resin-made harness protector for inserting and protecting a wiring harness.

In this case, the harness protector is, for example, composed of a lower gutter-shaped protector main body and an upper cover having an inverted U sectional shape (second protector main body) which are fixed to each other with locking members (a locking portion and a receiving portion). The gutter-shaped (U-shaped) wire guiding wall 6 is integrally provided on an end of the protector main body. A plurality of ribs 12 for preventing the tape from slipping having the same projecting lengths is provided on the wire guiding wall 6. The plate-shaped wire supporting wall 21 is integrally provided on the cover. A plurality of ribs 23 for preventing the tape from slipping having the projecting lengths higher as toward the tip 21a' is provided on the wire supporting wall 21. The electric junction box main body and the protector main body can be generically referred to as a hollow structure.

Further, in the above embodiment, two ribs 12 are provided on the wire guiding wall 6. However, it is also possible that the ribs 12 are not provided on the wire guiding wall 6, or only one rib 12 is provided on the wire guiding wall 6 (preferably, the rib 12 is provided on the tip side of the wire guiding wall 6), at least two ribs 23 are provided on the wire supporting wall 21, and the leading rib $23_1$ is projected longer than the other ribs 23. Further, it is also possible that at least two ribs 12, 23 are provided on each of the wire guiding wall 6 and the wire supporting wall 21, and the leading rib $12_1$, $23_1$ of the two ribs 12, 23 is projected longer than the other rib 12, 23.

Further, in the above embodiment, the leading rib $23_1$ of the wire supporting wall 21 is projected longer than the other ribs 23. However, in the other embodiment, the leading rib $12_1$ of at least two ribs 12 of the wire guiding wall 6 not the wire supporting wall 21 is projected longer than the other ribs 12. At least two ribs 23 of the wire supporting wall 21 have the same projecting height, or the rib 23 may not be provided on the wire supporting wall 21. Preferably, the wire supporting wall 21 is flexible, but the wire supporting wall 21 may not be flexible. Even when the wire guiding out portion 24 composed of the wire guiding wall 6 and the wire supporting wall 21 is formed in a taper shape, or inclined in a taper shape with the wound tape, the leading rib $12_1$ having the long projecting length of the wire guiding wall 6 prevents the tape from being displaced. While the tape is wound, preferably, the wire guiding wall 6 and the wire supporting wall 21 are parallel to each other, substantially parallel to each other, or in an inverted taper shape.

INDUSTRIAL APPLICABILITY

The wire guiding out portion structure for winding a tape according to the present invention can be used for preventing water or the like from entering an electric junction box mounted on, for example, a vehicle by allowing a tape to be hardly displaced and by improving the fixing property of the wiring harness to the wire guiding out portion, even when the wire guiding out portion of the electric junction box is formed in a taper shape, or even when a wire supporting wall of the wire guiding out portion is flexible inward in a sloped shape for absorbing a receiving amount of wires.

REFERENCE SIGNS LIST 6 wire guiding wall
$12_1$, $12_2$ rib
$23_1$ leading rib
$23_2$ second rib
26 wire
27a, 27b wound tape portion
27a sloped portion

The invention claimed is:

1. A hollow structure including a wire guiding out portion structure for winding a tape comprising:
    a gutter-shaped or inverted-gutter-shaped wire guiding wall; and
    a plate-shaped wire supporting wall opposed to the wire guiding wall,
    wherein at least two ribs for preventing a tape from slipping arranged parallel to each other in a wire guiding out direction are provided on at least one of the wire guiding wall and the wire supporting wall, and
    wherein a leading rib of the at least two ribs of the wire guiding wall or the wire supporting wall is projected longer in a wire radial direction than a second rib of the at least two ribs of the wire guiding wall or the wire supporting wall.

2. The hollow structure including a wire guiding out portion structure for winding a tape according to claim 1 wherein the at least two ribs for preventing a tape from slipping arranged parallel to each other in a wire guiding out direction are provided on both the wire guiding wall and the wire supporting wall, wherein the ribs of the wire guiding wall are projected in the same height in the wire radial direction, wherein a leading rib of the at least two ribs of the wire supporting wall is projected longer in a wire radial direction than a second rib of the at least two ribs of the wire supporting wall, and wherein while a plurality of wires are fixed between the wire guiding wall and the wire supporting wall with the wound tape, a virtual straight line connecting a distal end of the leading rib of the wire supporting wall and a distal end of the second rib of the wire supporting wall is parallel or substantially parallel to a virtual straight line connecting a distal end of the leading rib of the wire guiding wall and a distal end of the second rib of the wire guiding wall.

3. The hollow structure including the wire guiding out portion structure for winding a tape as claimed in claim 2,
    wherein the wire supporting wall is flexible in a thickness direction, and
    wherein while the wire supporting wall is bent inward with the wound tape, the virtual straight line connecting the distal end of the leading rib of the wire supporting wall and the distal end of the second rib of the wire supporting wall is parallel or substantially parallel to the virtual straight line connecting the distal end of the of the leading rib of the wire guiding wall and the distal end of the second rib of the wire guiding wall.

* * * * *